United States Patent Office 3,636,173
Patented Jan. 18, 1972

3,636,173
HYDRODEHALOGENATION PROCESS AND CATALYST
Lloyd E. Gardner, Bartlesville, Okla., assignor to Phillips Petroleum Company
No Drawing. Continuation-in-part of application Ser. No. 584,334, Oct. 5, 1966. This application July 28, 1969, Ser. No. 845,545
Int. Cl. C07c 17/00, 21/18
U.S. Cl. 260—653.5
5 Claims

ABSTRACT OF THE DISCLOSURE

Fluorohalocarbons are dehalogenated by contact in the presence of hydrogen with a catalytic composition containing aluminum fluoride and at least one metal phosphate.

RELATION TO OTHER INVENTIONS

This application is a continuation-in-part application of my copending application filed Oct. 5, 1966, having Ser. No. 584,334 now U.S. Pat. 3,505,417.

BACKGROUND OF THE INVENTION

This invention relates to the dehalogenation of fluorohalocarbons. In accordance with one aspect, this invention relates to an improved process for the dehalogenation of fluorohalocarbons by contacting same with a catalyst comprising a metal phosphate supported on a fluorided alumina. In accordance with a further aspect, this invention relates to a novel catalyst comprising a metal phosphate supported on a fluorided alumina. In accordance with a further aspect, this invention relates to a method for preparing a fluorine-containing catalyst comprising impregnation of alumina with a solution of a metal phosphate and activating by contacting with hydrogen fluoride at an elevated temperature. In accordance with a specific aspect, this invention relates to an improved process for the dehalogenation of fluorohalocarbons utilizing a novel catalyst comprising a metal of Group VI-B or Group VIII phosphate supported on a fluorided alumina. In aceordance with a further aspect, this invention relates to the removal of non-fluorine halogens from adjacent carbon atoms in a fluorohalocarbon by contacting the fluorohalocarbon with an aluminum fluoride containing catalytic composition and also containing a metal phosphate.

Processes for the dehalogenation of fluorohalocarbons using a variety of supports and catalysts are well known. However, short catalyst life and deterioration of supports caused by the highly reactive compounds formed during the reaction and by deposition of polymeric material on the catalyst composition have reduced the effectiveness of the prior art processes.

Accordingly, an object of this invention is to provide an improved process employing a catalytic composition of long life that can readily be regenerated.

Another object of this invention is to provide an improved process for the production of perfluoro-olefins.

Another object of this invention is to provide a catalyst that retains its activity after repeated regeneration.

A further object of this invention is to provide a catalyst having excellent selectivity to produce halogenated olefins without excess formation of carbon.

Other aspects, objects and the several advantages of the invention will be apparent to one skilled in the art upon studying the disclosure and appended claims.

STATEMENT OF THE INVENTION

In accordance with the invention set forth in said copending application, a process is provided for the dehalogenation of fluorohalocarbons (as used herein, the term fluorohalocarbons means saturated compounds containing only carbon, fluorine, and non-fluorine halogen) which comprises contacting the fluorohalocarbons with an aluminum fluoride-containing catalytic composition. Generally, the catalytic composition further contains at least one metallic element selected from Groups I through VIII of the periodic table, and/or compounds or mixtures thereof of those elements.

Further in accordance with said copending application, other materials that do not adversely affect the activity of such catalytic compositions can also be contained therein. Some examples of these metals include: magnesium, barium, copper, sodium, potassium, chromium, nickel, molybdenum, vanadium, zinc, tin, silver, tungsten, iron, indium, titanium, germanium, platinum, palladium, rhodium, rhenium, osmium, iridium, and the like. Suitable compounds containing these metals include the halides, nitrates, nitrites, oxides, carbonates, oxyhalides, formates, acetates, oxalates, hydrides, nitrides, hydroxides, bicarbonates, sulfates, etc.

In accordance with the present invention, it has been found that fluorohalocarbons can be effectively and efficiently dehalogenated by contacting same in the presence of hydrogen with the catalyst composition comprising a metal phosphate supported on a fluorine-containing alumina support.

Further in accordance with the invention, a novel catalyst is provided comprising a metal phosphate and a fluorine-containing alumina and preferably the metal phosphate is a Group I-B, II-B, VI-B or Group VII metal phosphate. The presently preferred metals are chromium and the iron group metals, especially nickel. Phosphates of other metals including, for example, molybdenum, tungsten, copper, zinc, cadmium, cobalt, iron, platinum, and the like, can be used.

Further in accordance with the invention, metal phosphate fluorine-containing alumina catalysts are prepared by impregnating alumina with a solution of a metal phosphate and activating the composition by contacting the metal phosphate impregnated alumina with a gaseous fluorine-containing material at an elevated temperature to form an active catalyst comprising metal phosphate supported on fluorided alumina.

DESCRIPTION OF THE PREFERRED EMBODIMENTS

The process of this invention is generally applicable to fluorohalo-carbons containing from 2 to 10 carbon atoms or more. The non-fluorine halogen or halogens to be removed can be any of chlorine, bromine, and/or iodine. When non-fluorine halogens are present on adjacent carbon atoms, non-fluorine halogen is removed from both of the adjacent carbon atoms to yield an olefinic bond.

Among the fluorohalocarbons which can be dehalogenated in accordance with the practice of this invention are 1,1-dichlorotetrafluoroethane,
1,2-dichlorotetrafluoroethane,
1,1-dichloro-2-bromo-trifluoroethane,
1-bromo-2-iodo-6-chloropentadecafluorooctane,
1-bromo-1,1,2,2-tetrafluoroethane,
1-bromo-2 - chloro - 3 - iodo - 5 - (trifluoromethyl)tetradecafluorooctane,
1,1,2-tribromo-2,2-dichlorofluoroethane,
1,1,2-trichloro-2,2,1-trifluoroethane,
octafluoro-2,3-dichlorobutane, and the like.

The process of the invention can be used for production of perfluoro-olefins and halofluoro-olefins containing from 2 to 10 carbon atoms as well as for the preparation of perfluoro-cycloolefins such as perfluoro-cyclobutene. Thus, this process is applicable to both open chain and closed chain fluoro-halocarbon compounds.

In general, the catalytic systems of this invention tend to remove non-fluorine halogen from adjacent carbon atoms in preference to fluorine halogen atoms. Thus, in one embodiment, when non-fluorine halogen atoms are present on adjacent carbon atoms, said non-fluorine halogens are removed in preference to fluorine. For example, when 1,2-dihalotetrafluoroethane is contacted with a catalyst of this invention in the presence of hydrogen, tetrafluoroethane is the resulting product as Equation I shows:

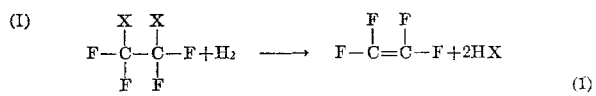

When all non-fluorine halogen atoms are bonded to only one carbon atom per molecule, one fluorine and one non-fluorine halogen are removed from the adjacent carbon atoms to form an unsaturated product as Equation II shows:

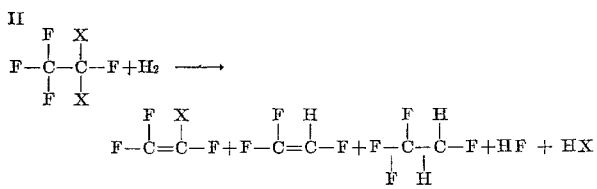

(1) X=non-fluorine halogen

Essentially pure fluorohalocarbons can be employed if substantially pure products are desired, or mixed fluorohalocarbons can be employed if mixtures are suitable as products.

The dehalogenation reaction of this invention can be implemented in suitable equipment known to the art by any suitable reaction technique. For example, the catalytic composition can be placed as a column in an enclosure of substantially inert material and a mixed stream of fluorohalocarbon and hydrogen can be passed through. For the lighter fluorohalocarbons, a vapor phase reaction is preferred though liquid systems can also be used. Reaction temperatures should generally be between 500 and 1100° F., though temperatures between 600 and 800° F. are usually preferred because of convenience. Similarly, though pressure between 0.1 atmosphere and 10 atmospheres or more can be employed, usually atmospheric pressure is preferred. The flow rate of gaseous feed will generally be within the range of about 10–5,000 volumes (standard conditions) per volume of catalyst per hour, usually being within the range of 100–500 volumes (standard conditions) per volume of catayst per hour. Reaction time will vary with temperature, reaction mixture, composition, and other variables; thus a reaction time, temperature, etc., for each set of conditions can be selected to give the greatest efficiency. The reaction can be carried out in a reactor made of tubular nickel, Monel or Inconel. Unconsumed reactants can be recycled if desired and the products can be purified by distillation or other suitable technique.

In the embodiment described, a ratio of 2–10 moles of hydrogen per mole of fluorohalocarbon is normally preferred in order to influence the equilibrium of the reactions, as represented by the chemical equations above, in favor of the unsaturated products. However, mole ratios between 0.5 and 100 moles of hydrogen or more per mole of fluorohalocarbon can be used. In addition, the hydrogen (or optionally, a hydrogen yielding compound)-fluorohalocarbon feed can be diluted with certain other compounds. Such compounds are: helium, neon, other inert gases, or any other material or combination thereof that does not deleteriously affect the process of the invention.

Examples of some fluoro-olefins which can be produced by the process of this invention include trifluoroethylene, chlorotrifluoroethylene, perfluoroethylene, perfluorobutene, perfluorocyclobutene, and the like.

As indicated above, the catalytic compositions of the invention comprise at least one metal phosphate and a fluorine-containing alumina support or base. The metals forming the metal phosphate can be any metal selected from Groups I–B, II–B, VI–B and Group VIII of the periodic table of the elements (Handbook of Chemistry and Physics, Chemical Rubber Co., 45th ed. [1964], p. B–2). Presently preferred metal phosphates, as indicated above, are chromium phosphate, phosphates of the iron group metals, especially nickel phosphate.

The fluorided alumina (or aluminum fluoride) portion of the catalyst is ordinarily low surface area after treatment with hydrogen fluoride (in the range of 5–50 square meters per gram). Before fluoridation, the aluminas preferably have surface areas in the range of 100–250 square meters per gram. Examples are eta or gamma alumina. These aluminas retain adequate physical strength after fluoriation.

The amount of metal phosphate promoter, expressed as the concentration of the free metal, in the catalyst generally is in the range of 0.1 to 10 weight percent of the catalyst composite, usually being no greater than about 3 weight percent of the catalyst composite. The balance of the catalyst composite is preferably a fluorided alumina. The amount of fluorine present in the fluorided alumina will ordinarily be in the range of 50 to 68 weight percent, ordinarily not greater than about 60 weight percent of the fluorided alumina.

As indicated hereinbefore, it has been found that metal phosphates, especially nickel and chromium phosphate, make effective and durable dehydrohalogenation catalysts when supported on fluorinated alumina. In the preparation of the catalyst, a solution of the metal phosphate is used to impregnate the alumina base which is preferably gamma-alumina. The excess solution is removed or drained from the impregnated alumina and the impregnated alumina is then dried and ordinarily heated by calcination at an elevated temperature for a period of time. The calcined metal phosphate-alumina is then activated by the vapor phase reaction of hydrogen fluoride in the presence or absence of an inert gaseous diluent such as nitrogen by contacting at an elevated temperature in the range of 200 to 700° F.; preferably hydrogen fluoride diluted with nitrogen at a temperature of about 300° F. is passed over or through the bed of metal phosphate-alumina and the contacting is continued until a hot zone of reaction passes through the bed of catalytic material. The final temperature ordinarily reaches 550–650° F. After the hot zone of reaction is passed through the catalytic mass, the catalyst is ready for contacting with a fluorohalocarbon compound.

As mentioned above, the aluminum fluoride containing catalytic compositions can be readily regenerated. A suitable method of regeneration comprises passing an oxygen-containing gas such as air over the catalytic composition while maintaining same at a sufficiently elevated temperature until substantially all carbon-containing compounds thereon are oxidized.

EXAMPLE I

Preparation of the catalyst

The catalyst of the invention was prepared by dissolving 40 grams of nickel phosphate [Ni$_3$(PO$_4$)$_2$·7H$_2$O] in a 50/50 by weight water concentrated HCl mixture. After dissolving the nickel phosphate completely in the water-HCl mixture, the solution was diluted to 200 cc. using H$_2$O/HCl as before.

The nickel phosphate solution prepared above was used to impregnate 85.1 grams of gamma-alumina by soaking in the above solution for one hour at 70° F. Excess solution was decanted and the alumina impregnated with nickel phosphate was dried under a lamp. The dried impregnated alumina and nickel phosphate were heated at 1000° F. for four hours in a muffle furnace.

The impregnate was placed in a 1″ O.D. x 12″ Monel tube and heated to 300° F. in $N_2$ (200 cc./min.). The tube was placed in a fluoridation reactor and fluorided with a 50/50 mixture of nitrogen and hydrogen fluoride at 300° F. A hot zone, reaching a maximum of 530° F. progressively moved through the tube showing that an exothermic reaction was taking place. The treatment was continued until HF breakthrough.

The analysis showed:

| | Percent |
|---|---|
| Ni | 2.1 |
| P | 1.27 |
| F | 63.0 |

The surface area, determined by BET method was 8 m.²/g. The analysis shows that substantially all of the phosphate remained on the catalyst.

EXAMPLE II

The catalyst prepared in Example I was used in the following reaction:

1. $CCl_2-F-C-ClF_2 + H_2 \xrightarrow{Cat.} CClF=CF_2 + 2HCl$

2. $CF_3CClFCClFCF_3 + H_2 \xrightarrow{Cat.} CF_3CF=CFCF_3 + 2HCl$

3. 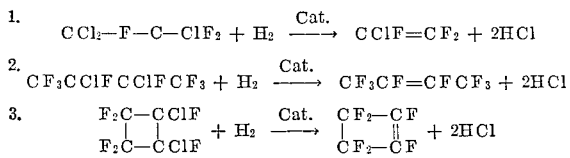

The reaction was carried out in a tube reactor charged with catalyst and heated to 600–700° F. $H_2$ was bubbled through a reservoir of the starting compound at 130 cc./min. (86 mm. Hg pressure). In reaction 1, the gaseous reaction mixture was diluted by a side stream of $N_2$ set to deliver 10 percent by volume to the stream of reactants. To repeat any of the runs, the catalyst was regenerated at 800° F. in a stream of air to burn off accumulated carbon—no decrease of catalytic activity was observed after such regeneration.

FOR REACTION 1: 1,1,2-TRICHLORO-2,2,1-TRIFLUOROETHANE ($CCl_2F$-$CClF_2$)

| | Run 1 | Run 2 | Run 3 | Run 4 |
|---|---|---|---|---|
| Temperature (° F.) | 725 | 650 | 700 | 700 |
| Conversion (percent) | 98 | 81 | 92 | 75 |
| Yield (percent)[1] | 54 | 57 | 55 | 56 |
| Percent of theoretical | 86 | 91 | 88 | 90 |

[1] Yield of desired olefin-chloro-trifluoro ethylene.

FOR REACTION 2: OCTAFLUORO-2,3-DICHLOROBUTANE

| | Run 1 | Run 2 | Run 3 |
|---|---|---|---|
| Temperature (° F.) | 750 | 750 | 650 |
| Conversion (percent) | 100 | 98 | 82 |
| Yield (percent)[1] | 73.8 | 74.7 | 62 |
| Percent of theoretical | 93 | 95.8 | 79 |

[1] Perfluorobutene-2.

FOR REACTION 3: HEXAFLUORO-1,2-DICHLOROCYCLOBUTANE

| | Run 1 | Run 2 | Run 3 |
|---|---|---|---|
| Temperature (° F.) | 600 | 750 | 750 |
| Percent conversion | 74 | 99 | 99 |
| Percent of theoretical | 80 | 67 | 65 |
| Percent olefin [1] | 55 | 47 | 45.3 |

[1] Perfluorocyclobutene.

EXAMPLE III

A catalyst was prepared as in Example I using chromic phosphate in place of nickel phosphate. This was tested on 1,1,2-trichloro-2,2,1-trifluoroethane as a reaction 1, Example II:

| | Run 1 | Run 2 |
|---|---|---|
| Temperature (° F.) | 700 | 700 |
| Conversion (percent) | 90 | 95 |
| Yield (percent) | 25 | 34 |
| Percent of theoretical | 41 | 55 |

This catalyst does not exhibit the high selectivity for the desired olefin but is effective in the reaction.

The data show that a metal phosphate impregnated alumina treated with HF to convert a substantial fraction of the alumina to the fluoride is useful in the preparation of fluorine-containing olefins by dehydrohalogenation.

EXAMPLE IV

In accordance with another run, 1,1,2-trichloro-1,2,2-trifluoroethane was contacted with a fluorided nickel phosphate on alumina catalyst with the resulting production of trifluoroethylene. The catalyst was prepared by impregnating gamma-alumina with nickel phosphate and then activating by heating at an elevated temperature with hydrogen fluoride.

The results of this run are set forth below:

TABLE I

| | |
|---|---|
| Catalyst | ([1]) |
| Hours on stream | 2.0 |
| Temperature, ° F. | 750 |
| Total feed rate, v./v./hr. | 170 |
| Hydrogen/1,1,2-trichloro-1,2,2-trifluoroethane, mole ratio | 6 |
| Average conversion of 1,1,2-trichloro-1,2,2-trifluoroethane, percent | 69 |
| Product, wt. percent (acid-free): | |
| Lights | 0.5 |
| Trifluoroethylene | 18.6 |
| Chlorotrifluoroethylene | 25.6 |
| 1,1-dichloro-2,2-difluoroethylene | 0.1 |
| 1,2-dichloro-1,2,2-trifluoroethane | 0.0 |
| 1,1,2-trichloro-1,2,2-trifluoroethane | 55.2 |

[1] Fluorided nickel phosphate on alumina.

The above data indicate that a good yield of trifluoroethylene and chlorotrifluoroethylene can be obtained by use of the catalyst of the invention.

I claim:

1. A process for the dehalogenation of at least one fluorohalocarbon containing from 2 to 10 carbon atoms wherein at least one halogen removed from said fluorohalocarbon by said dehalogenation is chlorine, bromine, or iodine, comprising contacting at a temperature ranging from 500 to 1100° F., said fluorohalocarbon in the presence of hydrogen with a catalyst consisting of a metal phosphate wherein the metal is selected from nickel and chromium, impregnated on eta or gamma alumina which has been activated by contacting with hydrogen fluoride in the vapor phase at a temperature of 300 to 650° F.

2. A process according to claim 1 wherein said fluorohalocarbon contains at least one non-fluorine halogen bonded to each of the two adjacent carbon atoms, whereby said contacting removes one of said non-fluorine halogens from each of said adjacent carbon atoms on at least one of said fluorohalocarbons present.

3. A process according to claim 1 wherein the mole ratio of hydrogen to fluorohalocarbon is in the range of 0.5 to 100 moles of hydrogen per mole of fluorohalocarbon.

4. A process according to claim 1 wherein said fluorohalocarbon is 1,1,2-trichloro-2,2,1-trifluoroethane, or octafluoro-2,3-dichlorobutane, and said metal phosphate is nickel phosphate.

5. A process according to claim 1 wherein said fluorohalocarbon is 1,1,2-trichloro-2,2,1-trifluoroethane and said metal phosphate is chromium phosphate.

References Cited

UNITED STATES PATENTS 2,685,606  8/1954  Clark _____ 260—653.5
2,912,470  11/1959  Kircher, Jr., et al. ___ 260—653.5

DANIEL D. HORWITZ, Primary Examiner

U.S. Cl. X.R.

252—437